Figure 1:
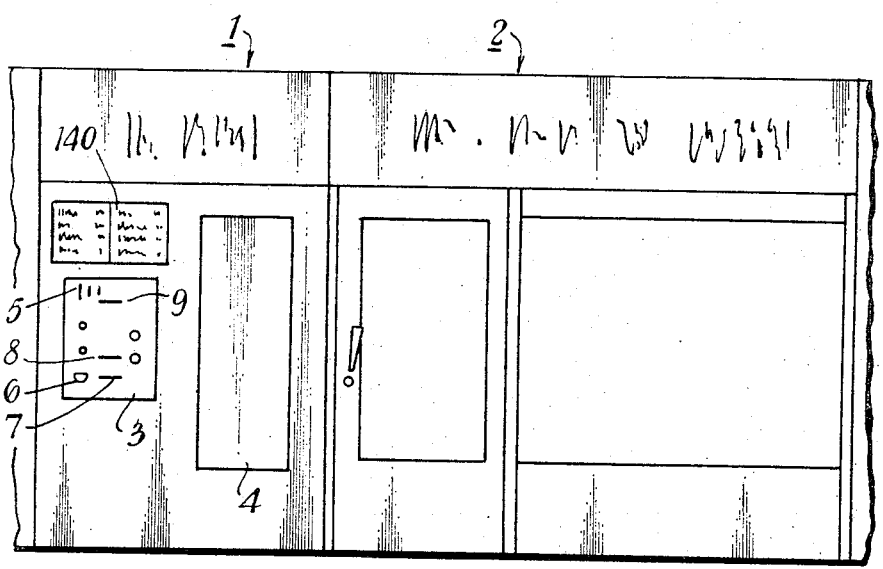

April 23, 1968

C. VARLEY 3,379,295

SELF-SERVICE APPARATUS

Filed Aug. 26, 1965

4 Sheets-Sheet 1

United States Patent Office 3,379,295
Patented Apr. 23, 1968

3,379,295
SELF-SERVICE APPARATUS
Clement Varley, "Whitefriars," 9 Dormiers Wells Lane,
Southall, Middlesex, England
Filed Aug. 26, 1965, Ser. No. 482,723
Claims priority, application Great Britain, Aug. 28, 1964,
35,440/64
30 Claims. (Cl. 194—4)

This invention relates to self-service apparatus and to token means for operating such apparatus.

An example of self-service apparatus which is embraced by the invention, is an automatic, token operated kiosk for the collection of garments and other goods for dry-cleaning or laundering, and for the delivery of these goods after the dry-cleaning or laundering thereof. It will be readily apparent that other applications of a similar nature are envisaged. For example, the goods for collection may comprise films for processing, or footwear for repairing. Alternatively, the apparatus may be of a type concerned solely with the safe storage of goods without provisions for processing the goods. As an example of this type of apparatus may be cited a bank safe deposit for the reception of valuables and the delivery of such valuables only to an authorized person. A further example is a luggage locker at a railway station, airport or other convenient location. The apparatus may be of a further alternative type, in which the apparatus is arranged to deliver specific goods upon receipt of appropriate instructions. For example, the apparatus may be such as receive doctor's prescriptions which are transmitted to a pharmacy for making up the required medicines, and these medicines are delived by the apparatus when required. The goods for delivery could be articles ordered in a store or supermarket and disposed in the apparatus for collection by the customer at a convenient later time.

It is an object of the invention to devise a system in which token means are employed in conjunction with self-service apparatus so that the operations of collection and delivery, as exemplified above, may be carried out as required without the necessity of employing a person for these operations, whereby the customer may at any time on any day make use of the self-service apparatus.

According to the present invention, there is provided a token operated self-service apparatus having sensing means for controlling access to goods, said sensing means being adapted to be operated by coded instructions carried by a token which also carries identification means relating to particular goods, the sensing means being such that the apparatus may only be made operative by presentation of a token carrying correct coded instructions, said apparatus also having means for delivering goods identified by said identification means, after the sensing means has been operated by the coded instructions to allow access to the goods.

The coded instructions may readily be formed as a printed electrical circuit, or a signal carried by a magnetic film formed on a surface of the token. The signal may be binary, for example. Alternatively, the coded instructions may be in the form of perforations capable of optical or mechanical sensing. Other optically sensed signals can also be employed.

In one preferred embodiment of the invention, the identification means is also in the form of coded instructions, such as a further printed electrical circuit or a further magnetic signal as the case may be. Such circuit or signal is adapted to be "read" by reading means which control the means for delivering the goods, whereby the goods identified by the identification means on the token are automatically selected and delivered. As an alternative to this arrangement, the token may carry identification means in the form of letters and/or numerals which are visible and recognisable by the user. In such a case, the means for delivering the goods is controlled by a device, such as a set of push-buttons or a telephone dial mechanism, which may be operated in accordance with the identification means visible on the token, whereby the goods identified on the token are automatically selected by the control device and delivered.

The token may carry a printed electrical circuit, a magnetic signal or other coded instructions which restrict the use of the token to a single self-service apparatus, or the coded instructions may be such that the token may be used in any one of a number of like self-service apparatuses. Furthermore, the coded instructions may contain features which are unique to a particular customer, so that the customer may use the token in a single apparatus, or any one of a number of apparatuses, for charging to the customer's credit. Thus the coded instructions may contain information relative to the customer's name, and if necessary relative to a credit limit for that customer. The apparatus would in this case incorporate means for noting the amount to be charged to the customer for each transaction.

With advantage, the self-service apparatus may be arranged so that a token is issued therefrom upon the insertion of money into the apparatus by the customer, the token serving as a receipt for the money and, where appropriate, for goods deposited by the customer into the self-service apparatus. As previously stated, this token also contains identification means in the form of, for example, a printed circuit, a magnetic signal or visible characters, identifying the goods placed in the apparatus by the customer.

The token may be intended for use in any one of a number of different kinds of self-service apparatus, some of which have been exemplified above. For example, the apparatus may be a kiosk for the collection of goods to be laundered or dry-cleaned, and the delivery of such goods after laundering or dry cleaning. In another example, the apparatus may be adapted for the collection of photographic films for developing and/or printing and for the delivery of the processed films. Similar apparatus could be used for the collection and delivery of boots and shoes for repair, and for the collection of doctor's prescriptions and delivery of pharmaceuticals and the like in accordance with the directions on the prescriptions. In each of the above examples, the apparatus is arranged for the collection of goods, and either the delivery of these goods to the customer after the service has been performed, or the delivery of other goods to the customer in accordance with the directions collected by the apparatus. Alternatively, however, the apparatus may be used for delivery only. Thus, for wholesalers, the apparatus may be adapted for a twenty-four hour service enabling the delivery of goods to retailers for charging to the retailer's accounts. The apparatus may alternatively be used in conjunction with conventional shops and supermarkets so that, outside the normal business hours of a shop or supermarket, a customer may collect goods which have already been paid for in the shop or supermarket, or which have been ordered, for example by telephone, and charged to the customer's account.

Figure 2:
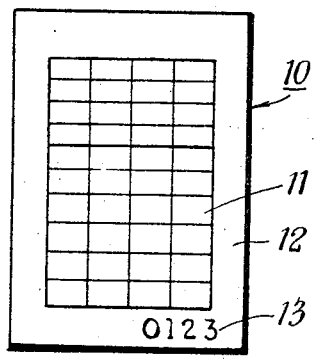
Figure 3:
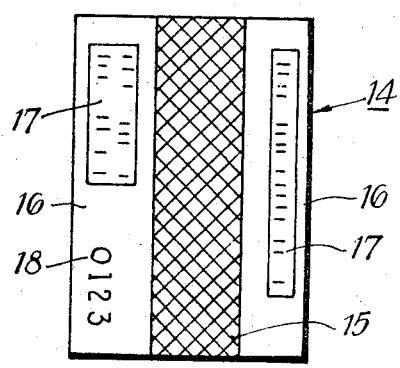
Figure 4:
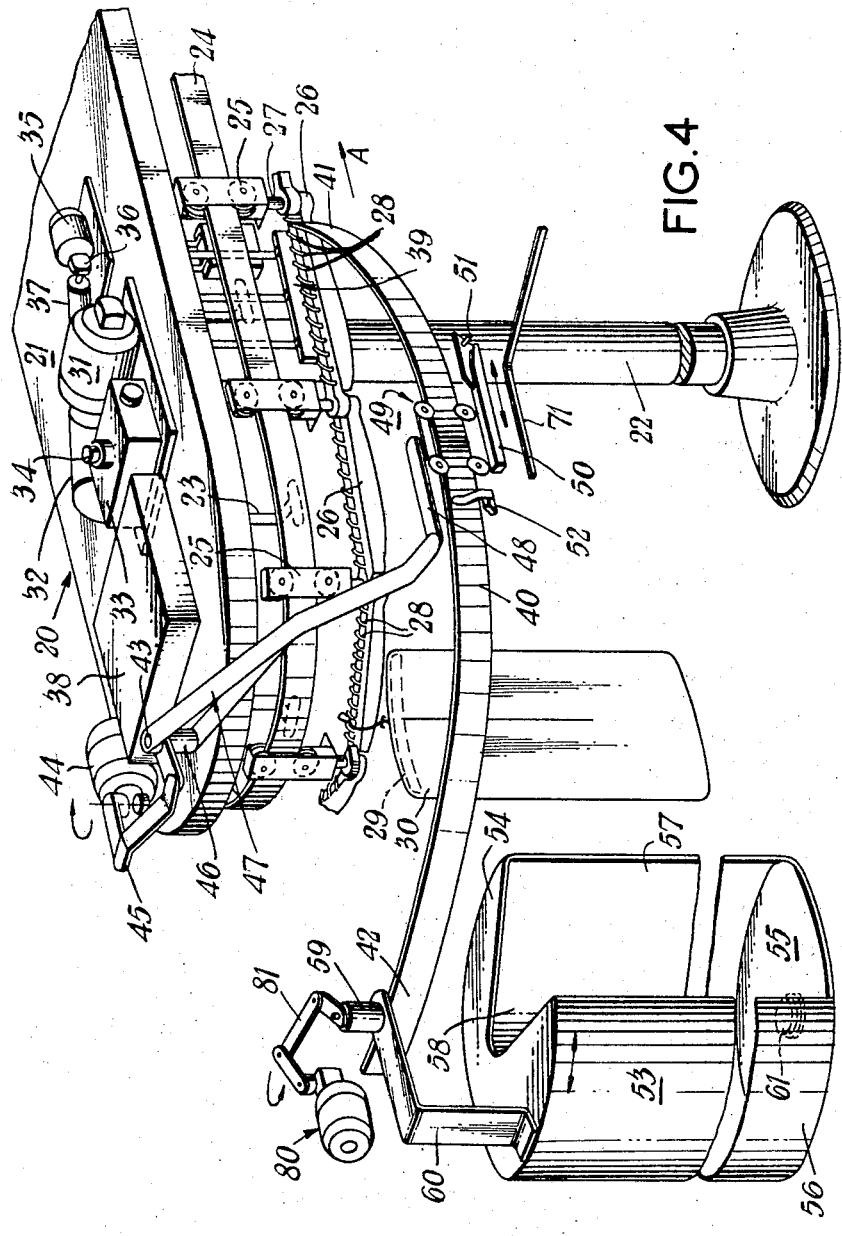
Figure 6:
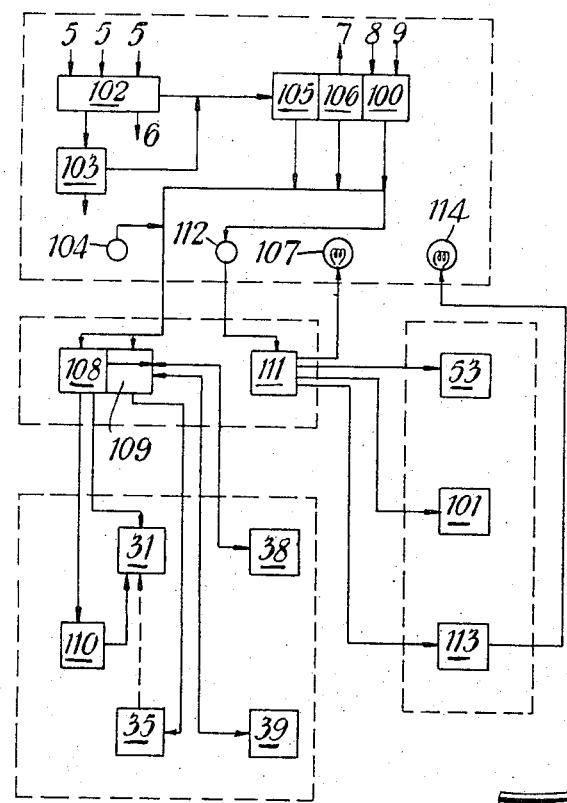
Figure 5:
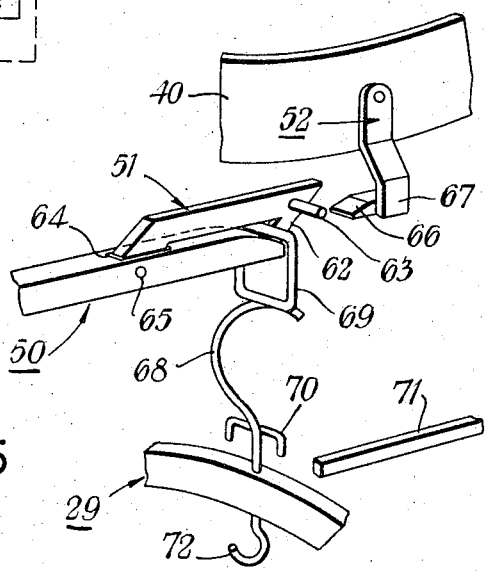
Figure 7:
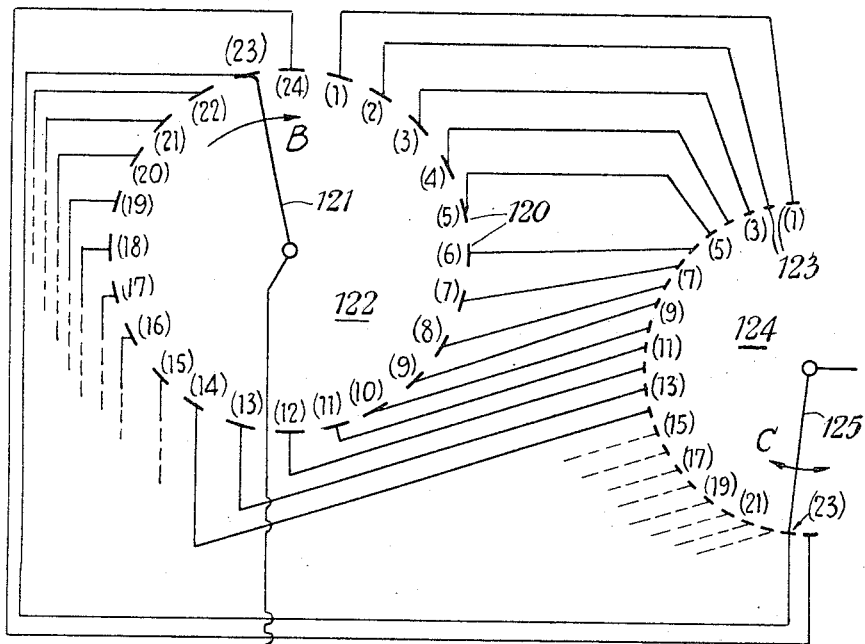
Figure 8:
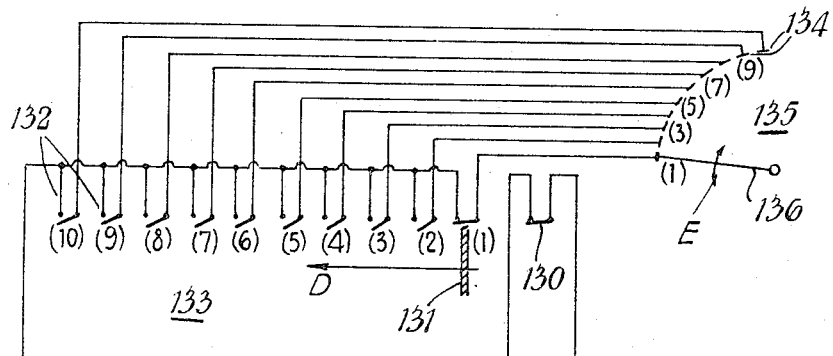

In order that the invention may be more clearly understood and readily carried into effect, reference will now be made by way of example to the accompanying drawings in which:

FIGURE 1 is a frontal elevation of a self-service apparatus installed in a row of shops, FIGURE 2 shows a face of one form of token for use in the apparatus, FIGURE 3 shows a face of another form of token for use in the apparatus, FIGURE 4 is a perspective view of part of the mechanism for the apparatus, FIGURE 5 is an enlarged detail of the mechanism shown in FIGURE 4, during operation, FIGURE 6 is a block diagram of the control for the apparatus, FIGURE 7 is a circuit diagram of one detail of the apparatus, and FIGURE 8 is a circuit diagram of a further detail of the apparatus.

The self-service apparatus shown in FIGURE 1 is the form of a kiosk 1 for the collection of goods which are to be dry-cleaned or laundered and for the delivery of such goods after the cleaning or laundering. Customers may as desired leave their goods in the apparatus for collection and obtain the delivery of the cleaner or laundered goods from the apparatus outside normal opening hours of a dry-cleaning and laundering establishment. As shown, the kiosk may if desired be used in conjunction with a conventional collection and delivery counter of a dry-cleaning and laundering establishment 2. Thus the kiosk 1 is incorporated in the shop front of the establishment 2.

Externally, the kiosk 1 essentially comprises an operating panel 3 and an outdoor door 4 through which goods may be placed in the apparatus or withdrawn therefrom. The operating panel has coin slots 5 for the reception of coins to the value of the service required. In addition, there may be slots for the reception of special discs or the like and issued by the company operating the apparatus, especially for values greater than the values of available coins, for example for the values of bank notes. There is furthermore a coin return cup 6 for the return of coins or discs which are bent, damaged or counterfeit. The operating panel 3 may additionally have provision for the insertion of credit account cards held by individual customers. There is a slot 7 for the issue of a token which is fully described below with reference to FIGURES 2 and 3. There are two further, similar slots 8 and 9 for the reception of the token. The slot 8 receives the token to allow the customer to open the door 4 and mechanism (not shown) behind this slot 8 is such that the token can be retrieved from the slot by the customer. The other slot 9 similarly receives the token to allow the customer to open the door 4, but after use the token is withdrawn into the apparatus by mechanism (not shown) behind the slot 9, so that the token cannot be re-used, except in circumstances to be explained hereinafter.

One form of token for use in combination with the apparatus is indicated by the reference numeral 10 in FIGURE 2. The token is rectangular and is cut from synthetic plastic sheet material. The token 10 is non-conductive of electric current, but has a portion 11 carrying a printed electrical circuit, part of which constitutes coded instructions for the apparatus. The conductive areas of the printed electrical circuit are preferably indistinguishable from the non-conductive areas of the token to avoid the possibility of counterfeiting. The circuit may be disguised, for example, by an overprinting of non-conductive ink in a pattern which is distinct from that of the circuit. Surrounding the portion 11 is a further portion 12 of the token. The portion 12 may be utilized for carrying printed information (not shown) of potential use to the customer, such as the name and address of the operating company. The portion 12 also carries a printed number, indicated by the reference numeral 13, which in the example shown is 0123. The number 0123 is unique to that particular token 10, in respect of the apparatus to which the token applies by virtue of the coded instructions constituted by a part of the printed electrical circuit. Another part of the printed electrical circuit duplicates the number 0123 in the form of a code which is readable by the apparatus. The number of the token constitutes identification means unique to the particular goods to which the token relates, this identification means being visible to the customer in printed form and being identifiable automatically by the apparatus in the form of a printed electrical circuit.

A similar token may comprise a cardboard mount which replaces the portion 12, but which is of the same rectangular configuration with an aperture for the reception of the portion 11 carrying the printed electrical circuit. The cardboard mount carries the same information and identification means as the token just described.

Both the tokens described above are for use in an apparatus which is constructed to sense the coded instructions and the identification means in the form of printed electrical circuits. However, the token may alternatively comprise coded instructions and identification means as magnetic signals. Such a token is shown in FIGURE 3. The token, indicated by the reference numeral 14, is a rectangular sheet of synthetic plastic material similar to the token 10. A central strip portion of the token is coated with a thin layer 15 of magnetizable material, in the manner of a tape for use in tape recording machines. The layer 15 is premagnetized in a desired pattern, the magnetic signals thereby produced serving as the coded instructions for the apparatus and as the identification means relating to the goods associated with the token. The apparatus with which the token is intended to be used, in constructed to sense the coded instructions and identification means in the form of magnetic signals. Portions 16 of the synthetic plastic token are not coated by the magnetizable material and lie one on each side of the layer 15. Similarly to the portion 12 of the token 10, the portions 16 of the token 14 carry printed information 17 for the customer's use, and a visible indication 18 of the identification means, i.e., the number of the token.

The mechanism for the apparatus is shown diagrammatically in perspective in FIGURE 4, the mechanism being broken away at one end. A storage conveyor indicated generally at 20 comprises a horizontal top plate 21 supported by posts 22. Hanging by brackets 23 from the underside of the top plate 21 is a continuous rail 24 which has two parallel straight portions joined at their ends by semicircular portions. The rail 24 constitutes a track for an endless train of wheeled supports 25 and conveyor links 26. The links 26 are pivoted end-to-end about pins 27 extending downwardly from the wheeled supports 25. Each link is divided by transverse projections 28 into ten separate locations for the storage of clothes hangers 29 and garment holding bags 30. FIGURE 4 shows only one hanger 29 and bag 30. The bags 30 are openable and are preferably of transparent synthetic plastic sheet material. The bags are such that garments may be hung on the hangers 29 or placed loosely in the bags.

The endless train of wheeled supports 25 and conveyor links 26 is arranged to be driven around the continuous rail in the direction indicated by the arrow A in FIGURE 4.

Major movements in the operation of the conveyor are effected in a conventional manner by an electric motor 31 through a belt drive 32 and a reduction gear box 33. The motor 31, belt drive 32 and gear box 33 are all mounted on the upper side of the top plate 21. The main driving shaft 34 of the gear box is vertical and extends downwardly through an aperture in the top plate 21. The lower end of the shaft 34 is connected in known manner by driving means (not shown) to the conveyor, whereby actuation of the motor 31 causes movement of the conveyor in the direction A. The motor 31 is the main conveyor motor.

Movement in operation of the conveyor is transmitted also to a link positioner 38 mounted adjacent the main motor 31 on the upper side of the top plate 21. Suitable gears (not shown) transmit drive from the main driving shaft 34 to the link positioner. The latter controls the main motor 31 in a manner hereinafter described in order to bring the conveyor to a position where a desired link 26 may be utilised.

Small movements in the operation of the conveyor are effected by a secondary electric motor 35 which is arranged to drive the main motor 31 through a reduction gear and freewheel 36, and a belt 37.

A location positioner 39 is mounted adjacent the path of the conveyor links 26. The location positioner 39 controls the secondary motor 35 in a manner hereinafter described in order to produce a small movement of the conveyor to a position where a desired location of the desired link 26 may be utilized.

A second rails 40 is supported near the conveyor rail 24. The supports for the second rail 40 are not shown in the drawings for the sake of clarity. One end 41 of the rail 40 is located close to the path of the conveyor links 26 and is on the opposite side of the links from the location positioner 39. The end 41 of the rail 40 is approximately parallel to the transverse projections 28 of the nearest link 26. The rail 40 is curved in a circular arc from the end 41 to the other end 42. Thus the rail 40 extends away from the links 26. The circular arc is centered on a pivot pin 43 mounted on the upper side of the top plate 21. An electric motor 44 is fixed near the pin 43 on the top plate 21. The motor 44 is arranged to drive a crank assembly 45 which is attached to a bearing sleeve 46 carried by the pivot pin 43. The bearing sleeve 46 has a bifurcated arm 47 attached thereto, the arm 47 having a drag link 48 attached to the outer end thereof. The arm 47 and drag link 48 support a wheeled trolley 49 which is adapted to run on the rail 40 from the end 41 to the end 42 and vice versa.

The trolley 49 has a pick-off finger 50 with a catch 51 for picking hangers 29 and garment bags 30 off the links 26 in operation. The catch 51 is operable by a release member 52 hanging below the track 40.

A drum 53 is mounted below the end 42 of the track 40 so as to be turnable about its longitudinal axis. This axis is vertical. The drum 53 has an upper plane wall 54, a lower plane wall 55 and a cylindrical wall 56. The last-mentioned wall is cut away to form an opening 57. This opening is extended at 58 into the upper planes 54 in a sector-like fashion, the opening 58 extending beyond the longitudinal axis of the drum. The drum is turnable on an upper bearing 59 fixed to the end 42 of the rail 40, the drum being mounted on the bearing 59 by a bracket 60, and on a lower bearing 61 in the lower plane wall 55. The drum 53 is of such a diameter and is so located that it may contain a hanger 29 and garment bag 30 which are carried by the pick-up arm 50 of the trolley 49. Furthermore owing to the opening 58, the drum 53 may turn about its axis while a hanger 29 and garment bag 30 are supported inside the drum by the trolley 49. Turning movement is imparted to the drum in operation by an electric motor 80 which is connected by a crank mechanism 81 to the upper bearing 59 so that the drum may be turned about its longitudinal axis. The motor 80 is supported near the end 42 of the rail 40 by means which are not shown for the sake of simplicity. The crank mechanism 81 enables the turning movement of the drum to be limited to reciprocal turning between limits with a constant direction of movement of the motor 80. However, the motor may if desired be directly connected with the drum 53 whereby the latter is always turned in the same direction.

The cylindrical wall 56 of the drum 53 is located adjacent an opening in the front wall of the kiosk and constitutes the outer door 4 of the kiosk (FIGURE 1). Backwardly extending sealing strips are provided around the opening in the front wall of the kiosk to prevent persons entering the kiosk by passing through the openings between the cylindrical wall 56 of the drum and the rear side of the front wall. The door 4 is opened to allow the access to the drum by turning the latter until the openings in the cylindrical wall 56 of the drum and in the kiosk wall are aligned. In a preferred alternative construction, the opening in the front wall of the kiosk is closed by a sliding hatch (not shown) which allows access to the drum only when the opening 57 faces the opening in the kiosk wall. In this way, persons are prevented from tampering with the turning movement of the drum 53. The sliding hatch is movable by an electric motor towards and away from the opening in the kiosk wall. When the outer door 4 is open, the cylindrical wall 56 of the drum 53 effectively constitutes an inner door of a chamber formed by the interior of the drum 53. Thus access to goods within the chamber is allowed, but access to the interior of the kiosk and the mechanism therein is prevented. As an alternative, the chamber may be closed by separate inner and outer doors, there being mechanism operative as between these doors so that the outer door may be opened only when the inner door is closed, and so that the inner door cannot open if the outer door is open.

Referring now to FIGURE 5, there is shown a detail of the pick-up finger 50 of the trolley 49. The catch 51 comprises a strip with a hook 62 and a laterally projecting pin 63 at one end thereof. The other end of the strip is located in an opening 64 in the upper side of the finger 50, where it is pivotable about a horizontal pin 65 with respect to the finger 50. Adjacent the hook 62, the end of the finger 50 is bevelled downwardly. In the position shown in FIGURE 5, the free end of the hook 62 contacts the bevelled surface of the finger 50. However, in operation, the hook 62 may when desired be raised by the release member 52, which comprises a cam surface 66 of a block which is attached by a bracket 67 to the side of the rail 40 in such a way that passage of the trolley 49 is not impeded.

FIGURE 5 furthermore shows how a hanger 29 is carried by the pick-up finger 50. The hanger 29 has a conventional wire hook 68 for hooking over a link 26 on the storage conveyor. A square eye 69 of wire is fixed to the upper part of the hook 68 for engagement with the end of the finger 50, the hanger being held by the catch 51. A double, downwardly extending wire hook 70 is fixed to the lower part of the hook 68. The eye 69 and the double hook 70 are located in a plane perpendicular to that of the hook 68. The double hook 70 is arranged to engage a transfer rail (see also FIGURE 4) when the hanger 29 is released from the pick-up finger 50 by the release member 51.

The transfer rail 71 extends from adjacent the rail 40 to the dry-cleaning and laundering area (not shown). The transfer rail 71 may be such a slope that hangers are caused to move under the action of gravity from the end adjacent the rail 40 to the processing area. Alternatively, the transfer rail may be slightly sloped, movement of the hangers being facilitated by vibration of the transfer rail 71. The hanger also has a small hook 72 for the attachment of messages invoices etc., the hook 72 being located within the associated garment bag 30 in use.

The rail 40, motor 44, crank assembly 45, arm 47, drag link 48 and the wheeled trolley 49 with the pick-up finger 50 together constitute an auxiliary conveyor, in combination with the transfer rail 71, for the collection of goods by the apparatus.

The operation and control of the apparatus will be described with reference to FIGURES 6, 7 and 8. It will be appreciated that the apparatus basically comprises (i) access control means, (ii) collection means for goods, (iii) selection means for goods to be delivered and (iv) pick-off, transport and delivery means for the goods.

Referring to FIGURE 6, the access control means comprises, in combination, a token 10 or 14 and sensing means 100 for sensing the coded instructions carried by the token when the latter has been inserted in the slot 8 or 9 in the operating panel 3. In an apparatus for use with a token 10, the sensing means 100 comprises electrical probes disposed at the correct locations for enabling current to be passed through a part of the appropriate printed electrical circuit carried by the token portion 11. Passage of current through a correct printed circuit is arranged to allow access to the services of the apparatus. In an apparatus for use with a token 14, the sensing means 100 comprises magnetic pick-up heads disposed so as to sense the correct magnetic pattern in the layer 15 on the token. Amplifiers are incorporated in the sensing means 100 to strengthen the signals obtained.

The collection means for goods comprises the drum 53 with its driving motor 80 and mechanism 81, and further comprises the auxiliary conveyor including the rail 40 motor 44, trolley 49 and transfer rail 71. The auxiliary conveyor is indicated by the reference numeral 101 in FIGURE 6.

The collection means is controlled by the insertion of coins through the slots 5 in the operating panel 3. The coins pass into a coin counter and tester 102, which can if desired be capable of counting and testing discs of high denominations previously issued by the operating company in exchange for cash. Anciliiary to the counter and tester 102 may be a receipt printer 103. The collection means is actuated (and where appropriate a receipt is printed by the printer 103) by pressing a button 104 on the operating panel 3. A token hopper 105 holds all the unissued tokens 10 or 14 for the apparatus, which tokens are issued through the slot 7 by a dispenser 106. The tokens, after being dispensed, are used to actuate the access control means described above. A light bulb 107 visible on the operating panel 3 is arranged to glow when a token is ready for collection, the bulb 107 being labelled appropriately.

The selection means for goods to be delivered includes the main conveyor motor 31 controlled by a unit 108, and the secondary conveyor motor 35 controlled by a unit 109. The two control units 108 and 109 are in turn controlled by the sensing means 100 which "reads" the information means incorporated in the printed electrical circuit or the magnetizable material of the token 10 or 14, as the case may be. The approximate position of the conveyor at any time is fed to the control unit 108 by the link positioner 38, whereby the control unit 108 is given information as to which link is adjacent the end 41 of the track 40. The fine position of the conveyor at any time is fed to the control unit 109 by the location positioner 39, whereby the control unit 109 is given information as to which of the ten locations on the link is adjacent the end 41 of the track 40. The control units 108 and 109 also actuate a brake 110 for the main conveyor motor 31. The information means encoded on the token is in every case comprised of two parts, one part being relevant to the conveyor link 26 upon which the required garment is carried, and the other part relating to the location of the garment on that link. In the example shown in FIGURES 2 and 3, the information means is the number 0123 encoded as a printed electrical circuit or a magnetic signal. The two parts are 01 and 23. The first part 01 relates to the location of the required garment on the link 26 identified by the second part 23. Hence the first part of the information means is sensed and is fed via the control unit 109 to the location positioner 39, and the other part is sensed and is fed via the control unit 108 to the link positioner 38.

The pick-off, transport and delivery means for the goods comprises the pick-off finger 50 of the trolley 49, the auxiliary conveyor for transport, and the drum 53 in the front wall of the kiosk for delivery.

A pick-off and kiosk control unit 111 controls the motors 44 and 80 of the auxiliary conveyor 101 and drum 53, respectively. A push button 112 is provided on the operating panel 3 for controlling the motor 80 to turn the drum 53 and thereby close the kiosk door 4. In case of failure to press the push button 112, the control unit 111 is arranged to close the door 4 after an interval of time from the opening of the door. The pick-off, transport and delivery means further comprises a garment sensing mechanism 113, relying on being tripped by the weight of a garment, or on the interruption by a garment of a light beam to a photo-electric cell, in order to sense whether or not a garment has been picked up by the finger 50 of the trolley 49. The garment sensing mechanism 113 is connected to control a light bulb 114 which glows if a garment is not picked up by the finger 50. The light bulb 114 is visible on the operating panel and is labelled with the legend "Garment Not Ready."

FIGURE 7 shows in more detail the arrangement of the link positioner 38. A series of twenty-four contacts 120 is disposed in a circle. A rotatable arm 121 is pivoted about one of its ends at the center of the circle, and has an electrical pick-up brush at its other end. The arm 121 is driven around the circle by a gear train (not shown) connected with the storage conveyor mechanism. Thus, in operation, the arm 121 follows movement of the storage conveyor. The arm 121 and the gear train are so arranged that when a particular link 26 is opposite the end 41 of the rail 40, the arm 121 makes electrical connection with the contact 120 relating to that link. In the position shown, the arm 121 indicates that the link 26 which is numbered 23 is at the pick-off point of the conveyor opposite the end 41 of the rail 40. The contact 120 and arm 121 constitute a link follower 122. In operation, the storage conveyor always moves in one direction indicated by the arrow A in FIGURE 4. Hence the arm 121 always moves in one direction which is indicated by the arrow B in FIGURE 7. Connected with the twenty-four contacts 120 of the link follower 122 are respective contacts 123 of a link code store 124. The link code store 124 comprises an arm 125 arranged to brush the contacts 123, which in this case are disposed in a semicircle. The arm 125 is brought to a desired location in response to the second part of the information means fed to the sensing means 100 by the token 10 or 14. The arm 125 may move in either direction, as indicated by the double arrow C. The token 10 or 14, as shown, carries the link information means 23 and accordingly, the link code store 124 is shown at the position 23. When the link follower 122 is in a position corresponding to that of the link code store 124, a circuit is completed to pass the information to the control unit 108 for the motor 31 and its brake 110.

The location positioner 39 is similar in principle, as will be described with reference to FIGURE 8. A location positioner enabler switch 130 is arranged to be closed by a link 26 selected by the link positioner 38, i.e. the link numbered 23 in the example shown in FIGURE 7. The switch 130 is closed in response to a signal received from the control unit 108 associated with the link positioner 38. The location positioner is thereby only brought into operation when a required link is in the vicinity of the pick-off position. Each link 26 carries an arm 131 which is arranged to travel along a series of ten switches 132 arranged in a straight line parallel to the direction of movement of the links 26. Since the storage conveyor moves in one direction only, the arms 131 move only in the direction indicated by the arrow D. The arms 131 and switches 132 are so disposed that as each arm passes along the line of switches, the switches are closed in turn, being allowed to re-open in turn as soon as the arm 131 has passed. The ten switches 132 correspond to the ten locations between the projections 28 on each link 26. Hence, the arm 131 and switches 132 together constitute a location follower 133. The position shown in FIGURE 8 corresponds to that where the location 01 is adjacent the pick-off point. The ten switches 132 of the location follower 133 are connected to respective contacts 134 of a location code store 135. The contacts 134 are disposed on the arc of a circle, and an arm 136 is arranged to swing round and made electrical connections with any desired contact 134. The arm 136 is brought to a desired location in response to the first part of the information means fed to the sensing means 100 by the token 10 or 14. The arm 136 may be moved in either direction, as indicated by the double arrow E.

The token 10 or 14, as shown, carries the location information means 01, and accordingly the location code store is shown at the position 01. When the location follower 133 is in a position corresponding to that of the link code store 124, a circuit is completed to pass the information to the control unit 109 for the motor 35.

The operation of the self-service apparatus will now be described with reference to a customer who wishes to deposit garments for dry-cleaning and to regain such garments after the necessary treatment thereof. The customer firstly studies an instruction and tariff card 140 (FIGURE 1) which is mounted in a convenient position adjacent the operating panel 3, and the customer thereby learns the price for dry-cleaning his goods. The customer inserts the necessary total of coins or high denomination discs in the appropriate slots in the operating panel 3. The counter and tester 102 totals the valid coins or discs and rejects damaged or counterfeit coins or discs into the cup 6. The customer presses the button 104 on the operating panel 3. This action has a number of consequences. Firstly, a token 10 or 14 is brought from the hopper 105 to the dispenser 106, from which it is issued to the customer through the slot 7. Secondly, the receipt printer 103 prints records of the inserted coins or discs on a duplicate receipt ticket, one copy of which is issued to the customer. Thirdly, power is switched to the electrical systems. Fourthly, the "collect ticket" light 107 glows on the operating panel. The customer collects his token and inserts it in the slot 8 in the operating panel so that the coded instructions and information means thereon may be read by the sensing means 100. As an alternative, the necessity for inserting the token 10 or 14 in the slot 8 may be dispensed with by arranging that the first consequence of the pressing of the button 104 is that the token is brought from the hopper 105 to the sensing means 100 where the coded instructions and information means are read.

The sensing means 100 reads the information means and passes the information to the link code store 124 and location code store 135. It will be assumed that token number 0123 is being issued. Accordingly, the link code store 124 is set up as shown in the position 23, and the location code store 135 is set up in the position 01. The sensing means 100 also checks that the coded instructions are correct for the particular apparatus, and the apparatus is only freed for use upon presentation of correct instructions.

In an expedient system, the token carries five channels of signals. Channel 1 is a code corresponding to one of the links 26 on the storage conveyor, i.e. 23. Channel 2 is a code corresponding to the particular location on that link 26, i.e. 01. Channels 3 and 4 are check codes for Channels 1 and 2, respectively, and may be either identical therewith or related thereto in a coded manner. Channel 5 is a code which is specific to the particular apparatus. The sensing means reads the signals in Channels 1 and 3 and compares them to ensure that they both relate to the same link 26. If correct, the signal is amplified and fed to the link code store 124. In a similar manner, Channels 2 and 4 are read and compared, and the information therein fed to the location code store 135. Channel 5 is readable by the sensing means 100 only if it contains the correct signal for the apparatus. Validity circuits are provided so that the apparatus is only freed for operation if the information contained in Channels 1 and 3 correspond with each other, and that in Channels 2 and 4 correspond with each other, and only if the signal in Channel 5 is correct for the particular apparatus. If an invalid code is sensed, for example a defaced or counterfeit token or a token belonging to a different apparatus, the token is returned to the customer and the apparatus is not freed for operation. It will be appreciated that where the token 10 or 14 is fed directly from the hopper 105 to the sensing means 100, there is no possibility of an invalid code.

Using the valid code 0123, the apparatus is now freed for operation, and the link and location code stores are set up in the positions 23 and 01 respectively. The main conveyor motor 31 is set in operation by the control unit 108, unless the conveyor happens already to be in the position where the link numbered 23 is at the pick-off point. The storage conveyor is driven at a relatively fast speed by the motor 31. The arm 121 of the link follower 122 is thereby caused to travel round the circle of contacts 120 in accordance with the movement of the conveyor. When the arm 121 reaches the contact numbered 23, the control unit 108 is actuated to stop the motor 31 and operate the brake 110. At this stage, the link numbered 23 is just approaching the pick-off point.

The location positioner enable switch 130 is at this time closed by the control unit 108. Passage of previous links numbered 21, 22 etc. has not affected the location positioner 39, even though the switches 132 have been closed in turn, since the circuit has been kept open by the switch 130. The secondary motor 35 is set in operation by the control unit 109 to move the storage conveyor forward relatively slowly. The secondary motor 35 uses the same gear train as the main motor 31, but additionally has the reduction gear 36. As the conveyor is moved slowly forward, the arm 131 of the location follower 133 closes the first switch 132. Since this in the location switch numbered 01 which is set by the location code store 135, circuit is closed to the control unit 109 and the secondary motor 35 is stopped. At this point, the location 01 of the link 23 is positioned opposite the end 41 of the rail 40, and the storage conveyor is stationary.

A signal is passed to the motor 44 to start the trolley 49 in motion towards the storage conveyor from the rest position shown in FIGURE 4. A hanger 29 and empty garment bag 30 are carried at location 01 of the link 23, although for clarity these items in that location are omitted from FIGURE 4. The bevelled end of the pick-off arm 50 engages the eye 69 on the hanger hook 68. Owing to the inclination of the hook 62, the catch 51 is lifted to allow the arm 50 to be pushed into the eye 69, whereafter the catch 51 drops to hold the hanger and garment bag in the manner indicated in FIGURE 5. Continued operation of the motor 44 causes the direction of motion of the trolley 49 to be reversed due to the crank mechanism 45. The hanger 29 and empty garment bag are conveyed by the trolley 49 towards the kiosk drum 53. At the end of the travel of the trolley 49, the position of the trolley is sensed by a mechanism (not shown) and the motor 44 is stopped by the pick-off and kiosk control unit 111. The sensing can conveniently be done by the garment sensing mechanism 113 if it is located in the vicinity of the drum 53. At the end of its travel, the trolley 49 is disposed above the drum 53 and approximately on the longitudinal axis thereof. The hanger 29 and garment bag 30 are located within the drum, having passed through the opening 57 in the wall 56. The opening 58 in the upper plane wall 54 allows passage of the hook 68 of the hanger 29.

The motor 80 is started by the pick-off and kiosk control unit 111 to turn the drum about its longitudinal axis until the opening 57 in the drum wall faces the opening in the front wall of the kiosk. The unit 111 stops the motor 80, and energises a motor to slide the hatch in the kiosk wall to expose the interior of the drum 53, if such hatch is provided.

The customer is thus allowed access to the interior of the drum 53, and he places his dirty garments within the garment bag 30. He may if desired leave a note of special attention to stains, etc., on a piece of paper attached to the hook 72. A pad may be available in the drum 53 for this purpose. It will be seen that only one set of garments may be placed in the drum at any one time, and that the customer is only allowed access to the interior of the drum and not to the mechanism of the kiosk.

The customer removes his token from the appropriate slot in the operating panel and retains the token for use in obtaining delivery of the dry cleaned garments. After removing the token, the customer may close the kiosk door 4 by pressing the button 112. If he fails to do so, then the kiosk door 4 is closed automatically by the control unit 111 after the elapse of a predetermined period of time. The closing of the door 4 is, of course, the reverse of the opening procedure. After the drum 53 has been returned to the position shown in FIGURE 4, the trolley 49 is moved back along the rail 40 to the rest position. As may be seen in particular from FIGURE 5, the hanger 29 and garment bag 30 are released before the trolley comes to a halt. As the pick-off arm 50 passes the release member 52, the pin 63 of the catch 51 rides up the sloping surface 66, allowing the eye 69 to be disengaged from the arm 50. The hanger 29 and the dirty garments in the bag 30 drop to the transfer rail 71, being caught by the double hook 70 or the hook 68. The dirty garments travel in the bag 30 to be collected by dry cleaning operatives at a convenient time.

When the trolley 49 has reached the rest position, the power supplies to the system are switched off.

The bags and hangers are numbered so that the operatives know the locations to which these items belong. There are one bag and one hanger for each location, and one token for each location. When a particular token is present in the hopper 105, an empty garment bag 30 waits at the location identified on the token.

When the customer wishes to collect his cleaned garments, he places his token 10 or 14 in the slot 9 in the operating panel 3. The sequence of operation is similar to that for the collection of garments by the apparatus except that no coins or discs are required. The sensing means 100 reads the part of the code (contained in Channel 5) which is common to all the tokens for the apparatus, and if the code is correct the apparatus is released for operation and the sensing means 100 reads and compares the identification means in Channels 1 and 3, and in Channels 2 and 4. The storage conveyor is brought to the appropriate position, as before, and the appropriate cleaned garments are picked-off and delivered to the drum 53. The pick-off arm is pivoted so that the release member 52 does not interfere with the movement of the trolley 49 and the garment bag attached thereto. The drum 53 turns so that the customer may remove the garments from the garment bag. The token 10 or 14 is retained by the apparatus in this case and passed back to the token hopper 105 for re-use. The drum 53 may turn back to the position of FIGURE 4 either after a fixed interval of time controlled by the unit 111, or upon the pressing of the button 112 by the customer.

If the customer has inserted a token 10 or 14 which does not have the exact coded information for the apparatus in question (i.e. a token issued by another apparatus or a counterfeit token), the apparatus will not be operable and the token will not be retained by the apparatus.

Also, if the customer attempts to collect his garments before they are ready, the above-described pick-off sequence is followed until the trolley 49 is brought back to the garment sensing mechanism 113. Since no garment bag would be available on the location required by the customer, the pick-off sequence would not result in a bag being conveyed by the trolley 49, and hence the garment sensing mechanism would prevent the drum from being turned to the open position. The apparatus will not retain the token 10 or 14 so that the customer may remove it for use at a later time. The light 114 is caused to glow so that the customer is appraised of the fact that his garments are not ready for collection.

In a modified form of the invention, the printed electrical circuit or magnetic signals on the token 10 or 14 may contain only information necessary to operate a particular kiosk, without including the information means which is unique to the location of the garments on the conveyor. This information means is provided only in a form which is visible to the customer. In this case, all the tokens contain the same printed electrical circuit or magnetic signals. The tokens in the hopper 105 are as before restricted to locations which contain an empty garment bag ready for use. The operating panel is similar to that described above, but is additionally provided with a mechanism similar to a telephone dialling mechanism for operating the drum 53.

In use, the kiosk is operated as described above by a customer wishing to deposit garments but the token which he receives from the token issuing slot is printed only with visual information means relative to the location. This visual information means comprises a series of letters and/or figures similarly to the token 10 or 14. For delivery of the cleaned garments to the customer, he places his token in the slot 9 and the sensing mechanism 100 reads the information in the printed electrical circuit or magnetic signals. If the coded instructions are correct for the particular apparatus in use, the apparatus is freed for operation as before. An audible or visible signal is preferably given so that the customer may know that the apparatus is ready for operation. This signal may comprise, for example, a colored light which is illuminated as soon as the sensing mechanism 100 has confirmed that the token is appropriate for operating the apparatus. The customer may then dial the letters and/or figures printed on his token, it being preferably arranged so that when the token is in the slot 9 in the operating panel 3, the part of the token carrying this information protrudes from the slot 9 so that the customer is not required to memorize the information. The dialling mechanism is connected with the link code store 124 and location code store 135 so that the storage conveyor is brought to a position for the auxiliary conveyor to collect the appropriate garments from the storage conveyor and deliver them to the drum 51 in the manner previously described.

Instead of the opening of the kiosk door 4 being automatic, it may be arranged so that the customer may press a push-button to open the door, this push-button being inoperative so long as the conveyors are not ready to allow the customer to collect the garments. In this case, the colored light visible signal indicating to the customer that the apparatus is operating may be arranged to be extinguished as soon as the garment is ready for collection so that the customer may know when to press the push-button. The token is retained by the kiosk so that it can be re-issued.

If the apparatus 1 is used in conjunction with a conventional collection and delivery counter for garments in the form of a shop 2, it may be arranged so that the kiosk will operate upon the insertion merely of a coin of low denomination in cases where the customer wishes to regain his garments from the conventional shop 2. In this case, the customer pays for the service, less the deposit made in the kiosk, over the counter of the shop in the normal way. It will be appreciated that in this case also, the customer may inquire at the shop if the kiosk does not deliver his garments because they are not ready for collection.

The embodiments described above may be adapted for other purposes, and advantageously may be adapted for the reception of valuables in a safe-deposit, or for the reception of luggage or other articles at railway stations and the like. At a railway station, left-luggage lockers must be disposed on valuable ground floor space. With the above-described apparatus, a relatively small area of ground floor space would be occupied by the collection and delivery chamber and the operating panel, the storage area for the luggage being located above the chamber.

As described above, the storage conveyor is stopped when the desired link is adjacent the pick-off point, and is thereafter moved forwards slowly by one to ten locations until the desired location is ready for picking off. The slow movement may, however, be replaced by providing ten pick-off arms similar to the arm 50, these arms being adjacent the ten locations of a correctly aligned link. Then the appropriate arm is brought into operation to pick off the required garment bag.

The apparatus described above in detail with reference to the accompanying drawings has twenty four links, each with ten locations thereon. Hence 240 locations are available for the collection and delivery of garments. The locations are divided into twenty four groups of ten for the purpose of locating a desired batch of garments, but it will be appreciated that other divisions are possible, such as forty eight groups of five, or twelve groups of twenty. Alternatively, all the locations may be grouped together on a single location identifier. The 240 locations are encoded, preferably in a binary system, on a disc geared to the storage conveyor. The token code is, in operation, stored in a location code store. The disc is rotated and is continuously sensed by a comparator circuit which compares the changing binary code on the disc and the stored code, and which stops the conveyor when the two codes coincide. The disc may of course be replaced by a drum or continuous tape.

I claim:

1. Apparatus for returning an item or article, left for processing, to a customer authorized to receive the article by virtue of possession of a particular token, comprising support means having a plurality of locations each adapted to receive an article to be returned to a customer, each location having a code peculiar thereto, a supply of reusable tokens, equal in number to the number of locations and each carrying identical coded information identifying the token as appropriate for use in the apparatus, and an identification code, exclusive to each token and rendering each token specific to one of said locations, means for supplying each customer depositing an article for processing with a token for use when retrieving the article after processing, sensing means for sensing whether the coded information on a particular token fed thereto at the time the article is returned to the customer renders the token appropriate for use in the apparatus, and for sensing the code on said particular token to determine which of said locations is specific to the code on said particular token, means for delivering, from said supporting means to a place at which articles are returned to the customers, the article at the specific location identified by the code on the token fed to the sensing means, and selecting means, actuated by the sensing means upon presentation of an appropriate token, for bringing the delivering means and said specific location into co-operating relationship thereby to permit transfer of said specific article from said supporting means to the delivering means for transfer to said place, and means for retaining in the apparatus the token when it is presented to the apparatus to retrieve a deposited article.

2. Apparatus according to claim 1 wherein each token comprises sheet material having printed thereon an electrical circuit in which are formed the coded information.

3. Apparatus according to claim 2, wherein the identification code is also formed in the printed electrical circuit.

4. Apparatus according to claim 1 comprising a storage hopper for said supply of tokens, and for retaining tokens after use and for returning the tokens to the storage hopper ready for reissue.

5. Apparatus according to claim 1, wherein the items carried by the storage conveyor are hangers for garments.

6. An apparatus according to claim 5, comprising a release member for releasing an article received by the apparatus, a transfer conveyor disposed near the release member to transfer an item released thereby to a reception area for an item introduced into the apparatus, and wherein each garment hanger has a laterally projecting hook for engagement with a rail forming the transfer conveyor.

7. Apparatus according to claim 6 wherein the items sensing means controls a warning signal to energize the same if no items are carried for the pick-off mechanism.

8. Apparatus as claimed in claim 1, wherein each token comprises sheet material carrying a layer of magnetizable material in which the coded information is stored as magnetic signals, said sensing means being operable by magnetic signals set up in said layer.

9. Apparatus according to claim 8, wherein the identification code is also stored as magnetic signals in the magnetizable material.

10. Apparatus according to claim 8, wherein the identification code is also carried on the surface of the token in the form of recognizable and visible characters.

11. Apparatus according to claim 8, wherein the sheet material is synthetic plastic.

12. Apparatus according to claim 1 comprising an endless storage conveyor for said items, said conveyor being located close to a pick-off point at which items may be removed in operation by a pick-off mechanism forming part of the delivering means.

13. Apparatus according to claim 12, wherein a storage conveyor follower is connected with the storage conveyor to reproduce movements of the storage conveyor in operation and to indicate the position of the storage conveyor with respect to the pick-off point, the storage conveyor follower forming part of the means for selecting items identified by said identification code.

14. Apparatus according to claim 3, wherein the storage conveyor follower is connected with an identification code store, the identification code store being adapted to store, in operation, the identification code on the token fed to the sensing means, the identification code store forming a further part of the means for selecting items identified by the identification code.

15. Apparatus according to claim 14, wherein the storage conveyor follower and identification code store are adapted to control a motor for imparting movement to the storage conveyor, the arrangement being such that, in operation, when the storage conveyor follower indicates a position of the storage conveyor which coincides with the identification code stored by the identification code store, the storage conveyor motor is stopped.

16. Apparatus according to claim 14, wherein the storage conveyor is divided into a plurality of groups, each group containing a number of locations for the storage of items, and wherein the storage conveyor follower comprises a group follower and a location follower, the group follower being connected with the storage conveyor to reproduce movements of the storage conveyor in operation and to indicate which group of the storage conveyor is adjacent the pick-off mechanism, the location follower being arranged adjacent the storage conveyor to indicate which location of the group of the storage conveyor is adjacent the pick-off mechanism, and wherein the identification code store comprises a group code store connected with the group follower and a location code store connected with the location follower, the location follower being controllable by the group follower and group code store so that the location follower is freed for operation only when a group selected by the group follower and group code store is adjacent the pick-off mechanism.

17. Apparatus according to claim 16, wherein the group follower consists of a plurality of first electrical contacts equal in number to the number of groups, the first electrical contacts being disposed in spaced relationship on a first circular arc, and a first brush arm arranged for turning movement about the centre of the first circular arc so as to be capable of brushing each of the first electrical contacts in turn, the first brush arm connected to the storage conveyor so as to move in response to movements of the storage conveyor in operation, and wherein the group code store consists of a plurality of second electrical contacts equal in number to the number of groups, the second electrical contacts being disposed in spaced relationship on a second circular arc, and a second brush arm arranged for turning movement about the center of the second circular arc so as to be capable of brushing each of the second electrical contacts in turn, the second brush arm being adapted to move to a second electrical contact identified by the identification code fed to the sensing means, the first electrical contacts being connected to respective second electrical contacts and the first brush arm being in operative connection with a main motor for imparting major movements to the storage conveyor, the arrangement being such that, in operation, when the first brush arm brushes a first electrical contact which is connected with the second electrical contact identified by the identification code, the main storage conveyor motor is stopped.

18. Apparatus according to claim 17, wherein the location follower consists of a plurality of electrical switches equal in number to the number of locations in each group, the electrical switches being disposed in spaced relationship, and being disposed in a line equidistantly spaced from a portion of the path of the storage conveyor, a projecting arm fixed in relation to each group of the storage conveyor so as to be capable of closing the electrical switches in turn, and a switch operable to free the location follower for operation, and wherein the location code store consists of a plurality of third electrical contacts equal in number to the number of locations in each group, the third electrical contacts being disposed in spaced relationship on a third circular arc, and a third brush arm arranged for turning movement about the center of the third circular arc so as to be capable of brushing each of the second electrical contacts in turn, the third brush arm being adapted to move to a third electrical contact identified by the identification code fed to the sensing means, the electrical switches being connected to respective third electrical contacts and being in operative connection with a secondary motor for imparting slow movement to the storage conveyor, the arrangement being such that, in operation, when the projecting arm closes an electrical switch which is connected with the third electrical contact identified by the identification code, the secondary storage conveyor motor is stopped.

19. Apparatus according to claim 14 wherein the storage conveyor is divided into a plurality of groups, each group containing a number of locations for the storage of items, and wherein the pick-off mechanism comprises a number of pick-off fingers equal to the number of locations in each group, the pick-off fingers being attached to a trolley which is movable towards and away from the storage conveyor, each pick-off finger being capable of engaging items carried by the storage conveyor at the location corresponding to the pick-off finger, and wherein the identification code store comprises a group code store and a location code store for storing the identification code which is in two parts relating, respectively, to the required group and required location, the storage conveyor follower being arranged to stop the storage conveyor in operation in response to the identification code stored by the group code store so that the locations of the required group are disposed opposite the respective pick-off fingers, the pick-off fingers being controllable in response to the identification code stored by the location code store to engage the items in the required location of the group.

20. Apparatus according to claim 12, wherein the pick-off mechanism comprises a pick-off finger attached to a trolley which is movable towards and away from the storage conveyor, the pick-off finger being capable of engaging items carried by the storage conveyor.

21. Apparatus according to claim 20, wherein the trolley is movable from a position adjacent the storage conveyor to a position adjacent a door for allowing access to items carried by the pick-off finger on the trolley, or one of the pick-off fingers on the trolley.

22. Apparatus according to claim 21, wherein the access door is constituted by a cylindrical wall of a drum mounted for rotation about its longitudinal axis, the drum being disposed so that the cylindrical wall thereof may close an opening formed in an exterior wall of the apparatus, the cylindrical wall having an opening therein through which items may be carried by the pick-off finger on the trolley, or one of the pick-off fingers on the trolley, whereby the access door may be opened by turning the drum about its longitudinal axis to cause the opening in the cylindrical wall to coincide with the opening in the exterior wall of the apparatus, thereby to allow access to the items within the drum.

23. Apparatus according to claim 22, wherein the longitudinal axis of the drum is vertical, and wherein the trolley is movable on a rail extending between a position adjacent the storage conveyor and a position which is vertically above the drum and which is on or near the longitudinal axis of the drum, whereby items carried by the pick-off finger on the trolley, or one of the pick-off fingers on the trolley, may hang therefrom within the drum.

24. Apparatus according to claim 21, wherein the, or each, pick-off finger on the trolley has a catch for securing the items thereto, and wherein a release member is mounted so as to co-operate with the catch, when the trolley is moving in operation away from the access door, in such a way that the catch is actuated to release items carried by the pick-off finger.

25. Apparatus according to claim 24, wherein a transfer conveyor is disposed near the release member to transfer items released thereby to a reception area for items introduced into the system 26. Apparatus according to claim 12, wherein the pick-off mechanism comprises a pick-off finger attached to a trolley which is movable towards and away from the storage conveyor, the pick-off finger being capable of engaging items carried by the storage conveyor and wherein each garment hanger has a hook for engagement with the storage conveyor and an eye capable of being entered by the free end of the pick-off finger, or one of the pick-off fingers, on the trolley whereby the pick-off finger may engage the garment hanger and remove the same from the storage conveyor.

27. Apparatus according to claim 12, wherein item sensing means is arranged to operate in conjunction with the pick-off mechanism to sense whether an item is carried by the pick-off mechanism.

28. Apparatus according to claim 27, wherein the item sensing means controls the pick-off mechanism to stop the same if no item is carried by the pick-off mechanism.

29. A self-service deposit and return apparatus comprising support means having a plurality of locations each adapted to receive and store an article, each location having a code peculiar thereto, article receiving means at each location, a supply of tokens each carrying identical coded information identifying the token as appropriate for use in the apparatus, and a code, exclusive to each token and rendering each token specific to one of said locations, coin actuated means for dispensing a token upon presentation thereto of appropriate coins, sensing means to which tokens are fed for determining whether the token carries coded information rendering it appropriate for use in the apparatus and for determining which of said locations is specific to the presented token, a delivery arrangement, operable only on presentation of an appropriate token, for conveying the article receiving means from said specific location to a zone at which the customer has access to the receiving means for placing an article on, or removing an article from, the receiving means, driving means, actuated by the sensing means upon presentation of a correct token, for bringing said specific location and the delivery arrangement into co-operating relationship for transfer of an article receiving means between them, means for returning the token to the customer at the time an article is deposited and after sensing by the sensing means for retention by the customer for use at the time the article is returned to the customer, and means for retaining in the apparatus the token when it is presented to the apparatus to retrieve a deposited article.

30. A self-service apparatus comprising support means having a plurality of locations each adapted to receive an article to be returned to an authorized person, each location having a code peculiar thereto, article receiving means at each location, the article receiving means and the location carrying identical visual representations of the code peculiar to the location, a supply of tokens each carrying identical coded information identifying the token as appropriate for use in the apparatus, and a code, exclusive to each token and rendering each token specific to one of said locations, coin-actuated means for dispensing a token from said supply at the time an article is presented to the apparatus for processing, and upon presentation to the coin-actuated means of a sum covering the cost of the processing to which the article is to be subjected, sensing means for receiving tokens from said supply for sensing whether the coded information on a particular token fed thereto renders the token appropriate for use in the apparatus, and for sensing the code on said particular token to determine which of said locations is specific to the code on said particular token, the token being presented to the sensing means both at the time the article is deposited and at the time the article is returned, a delivery arrangement operable both at the time the article is deposited and at the time the article is returned for conveying the article receiving means, specific to the token presented to the sensing means, from the support means to a location at which the customer has access to the article receiving means, the article receiving means having the article to be processed placed therewith at the time the article is deposited and removed therefrom at the time the article is reclaimed, driving means, actuated by the sensing means upon presentation of an appropriate token, for bringing said delivery arrangement and said specific location into co-operating relationship thereby to permit transfer of said specific article receiving means from said supporting means to said arrangement and delivery to said location, means for diverting, to a processing location, an article receiving means being propelled by said arrangement away from said location at the time the article to be processed is deposited, means for returning the token to the customer after the token has been sensed at the time the article is deposited, and means for retaining the token presented to the sensing means upon the article being returned to the customer.

References Cited

UNITED STATES PATENTS

| | | | |
|---|---|---|---|
| 1,936,515 | 11/1933 | Love | 194—4 X |
| 2,906,505 | 9/1959 | Orr et al. | 194—4 X |
| 2,986,328 | 5/1961 | Delas | 194—4 X |
| 2,997,133 | 8/1961 | Gehrke | 194—4 X |
| 3,020,994 | 2/1962 | Kirk | 194— 4 X |
| 3,097,347 | 7/1963 | Simjian | 194— 4 X |
| 3,110,384 | 11/1963 | Rub | 194—4 X |
| 3,149,708 | 9/1964 | Forse | 194—1 |
| 3,165,187 | 1/1965 | Smith | 194—4 |

STANLEY H. TOLLBERG, *Primary Examiner.*

ROBERT B. REEVES, *Examiner.*